United States Patent

[11] 3,614,055

| [72] | Inventor | Joseph W. Douglas<br>Chelsea, Mich. |
|---|---|---|
| [21] | Appl. No. | 864,289 |
| [22] | Filed | Oct. 1, 1969 |
| [45] | Patented | Oct. 19, 1971 |
| [73] | Assignee | Chrysler Corporation<br>Highland Park, Mich.<br>Continuation-in-part of application Ser. No.<br>677,442, Oct. 23, 1967, now abandoned. |

[54] PRESSURE-REGULATING VALVE
4 Claims, 3 Drawing Figs.

[52] U.S. Cl. .................................................. 251/61.2,
251/81, 251/282, 188/181 A, 303/21 F
[51] Int. Cl. .................................................. B60t 8/12,
F16k 31/145
[50] Field of Search ........................................ 251/77, 81,
61.2, 61.3, 61.4, 61.5, 63.4, 282; 188/181 A;
303/21 F, 21 CG, 21 CF

[56] References Cited
UNITED STATES PATENTS

| 2,897,836 | 8/1959 | Peters et al. ................ | 251/282 X |
| 3,093,422 | 6/1963 | Packer et al. ................ | 303/21 F |
| 3,260,556 | 7/1966 | Packer ........................ | 251/61 X |

Primary Examiner—Arnold Rosenthal
Attorney—Harness, Talburtt and Baldwin

ABSTRACT: A valve for reducing pressure in a hydraulic brake line upon skidding of a vehicle wheel. The valve is constructed with a bore having one end portion interconnected with the brake line, and a piston slidably disposed in the bore so as to form a chamber in communication with the brake line. The opposite end portions of the bore are in communication so that equal brake actuating hydraulic fluid pressure is exerted on each end of the piston. The valve contains a pressure differential operated member such as a piston or diaphragm which is operable to move the piston so as to seal the brake line and increase the volume of the chamber thereby reducing pressure in the brake line.

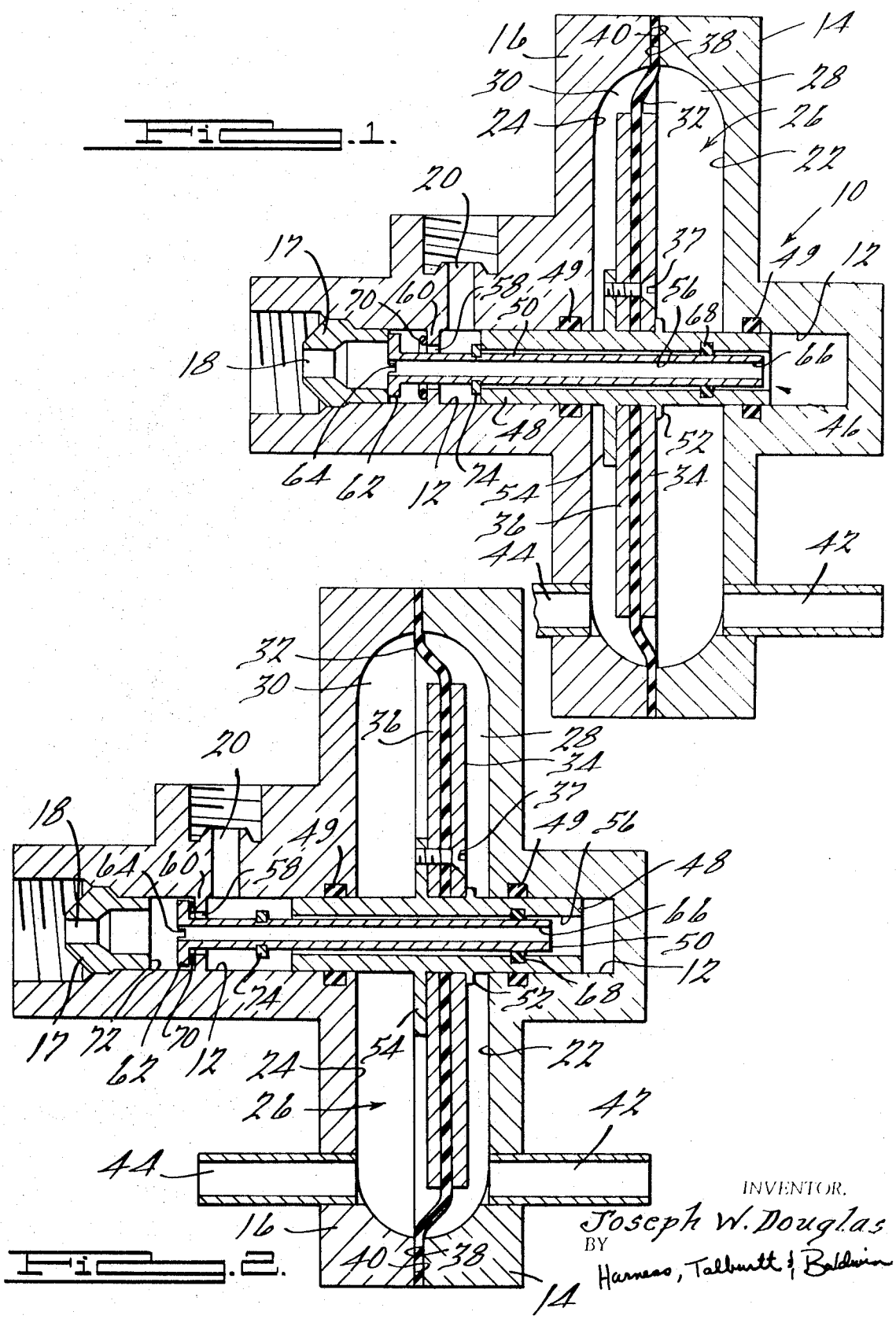

PRESSURE-REGULATING VALVE

This is a continuation-in-part of application Ser. No. 677,442, filed Oct. 23, 1967, and now abandoned.

BACKGROUND OF THE INVENTION

The present invention relates to motor vehicle braking systems and more particularly to a brake antiskid device for automatically reducing the application of braking force to a wheel whenever the wheel "locks" or skids.

It is now well established that the lockup or skidding of one or more wheels of a vehicle results in loss of directional control and greatly increases the distance required to stop the vehicle. Accordingly, it is necessary that the wheels of a vehicle maintain a rotating condition relative to the road if maximum braking and vehicle control is to be obtained. Of the various methods proposed to accomplish this result, one system which has found wide acceptance involves the use of a valve to reduce the hydraulic fluid pressure in the brake mechanism of the skidding wheel until the wheel or wheels revolve freely. Preferably, each wheel is provided with a pressure reducer valve and the valve is positioned in the brake line to each wheel between the master cylinder and the brake cylinder of the wheel brake mechanism.

Although the above described arrangement is being used in antiskid brake systems, experience has shown that certain disadvantages are presented due to the pressure reducer valves used therein. Thus, heretofore known pressure reducer valves are constructed such that the brake actuating hydraulic fluid i.e., the fluid in the brake lines connected to the individual wheel cylinders, enters the valve, passes through an orifice into a bore, and passes from the bore to the wheel brake cylinder through an outlet in communication with the bore. An element such as a ball is adapted to seat so as to seal the orifice, thereby cutting communication between the brake actuating hydraulic fluid inlet and outlet ports of the valve, and the position and movement of the ball is controlled by a piston which is slidably disposed in the valve bore. In turn, the piston is carried by a diaphragm member such that the piston normally maintains the ball in an unseated position thereby establishing communication between the inlet and outlet ports of the pressure reducer valve. Movement of the diaphragm is effected by the differential between the pressures on opposite sides of the diaphragm. Thus, the operation of the valve depends upon controlling the movement of the diaphragm.

From an examination of heretofore used pressure reducer valves, it is seen that the full brake actuating hydraulic fluid pressure in the brake line is exerted against one end of the piston member, thereby subjecting only one side of the diaphragm to hydraulic fluid pressure. Accordingly, to supply an equal pressure to the other side of the diaphragm a spring member is employed. Unfortunately, this type of construction has many disadvantages. For example, as the brake actuating hydraulic pressure in the brake system is substantial, a large heavy spring must be used, which in turn necessitates the use of a large heavy diaphragm. Obviously, the need for such large spring and diaphragm members results in a pressure reducer valve of considerable size, with the commercially available valve devices being approximately 7 inches in diameter. It will be appreciated that this large size is highly undesirable for several reasons. Thus, the serious space limitations adjacent the wheel of the vehicle, or in the engine compartment in the event it is desired to so locate the valve, make it extremely difficult to employ such valves, especially as it is preferable to use a pressure reducer valve in conjunction with each of the wheel brakes of the vehicle. More importantly, it has been found that the valves, due to the mass involved, are somewhat slow in reacting to a wheel skid condition and, hence, not as effective as a smaller valve of less mass.

Yet another serious disadvantage of presently known pressure reducer valves is that they greatly limit the hydraulic pressure which can be applied to the wheel brakes. Thus, the brake actuating hydraulic fluid pressure which acts on one side of the diaphragm cannot be allowed to exceed the spring pressure acting on the opposite side of the diaphragm. At the same time, the amount of spring pressure which can be used is substantially limited by the space available for the valve. For example, in present brake systems, it is known that pressures of 1,400–1,600 p.s.i. and higher are encountered because of poor brake linings or brake fade conditions due to trailer towing, mountainous driving and other situations involving frequent brake application. Yet, due to limitations as to the physical size of the spring and diaphragm that can be employed, presently known pressure reducer valves operate at pressures not exceeding about 1,200 p.s.i. Accordingly, whereas the master cylinder is capable of supplying a pressure of 1,400 p.s.i. when required, only about 1,200 p.s.i. can be applied to the wheel brake, since at this pressure the diaphragm will be actuated causing the ball to seat and isolate the wheel brakes from the master cylinder.

SUMMARY OF THE INVENTION

From the foregoing, it will be recognized that a pressure reducer valve is needed which is constructed such that there is substantially equal brake actuating hydraulic fluid pressure on each side of the diaphragm component and, which is inexpensive to manufacture and maintain. Moreover, the valve should be smaller than such heretofore known devices so as to be capable of faster operation to correct a potential skid condition and to permit the use of small associated control equipment such as solenoid valves, hoses, vacuum reserve tanks and the like. Finally, a pressure reducer valve is needed which does not limit the hydraulic pressure which can be applied to the brakes during normal nonskidding operation.

Accordingly, it is an object of this invention to provide an improved pressure reducer valve for automatically reducing the application of braking force to a wheel brake upon skidding of the wheel.

A further object of the invention is to provide an improved antiskid device for use with an automobile brake system, said device being inexpensive to manufacture, compact in size, substantially completely self-contained in a single assembly, and being relatively easy to mount adjacent an automobile wheel.

A still further object is to provide an improved pressure reducer valve for use in an antiskid system wherein substantially equal brake actuating hydraulic pressure is provided on each side of the pressure responsive actuator component of the valve.

Yet another object is to provide a pressure reducer valve of small, light weight construction which has quick response characteristics and which does not limit the amount of hydraulic pressure which can be supplied to the wheel brakes of a vehicle.

Other objects and advantages of the present invention will become apparent from a further reading of the description, appended claims and accompanying drawing.

Briefly, the pressure reducer valve of this invention includes a housing having a cylinder or bore therein, an inlet in communication with the bore adapted to be connected with the master cylinder of a hydraulic braking system, and an outlet from the bore adaptable for connection with a wheel brake mechanism. The housing is further provided with a cavity which is divided into two chambers by a pressure responsive member such as a diaphragm or piston with each chamber being provided with a port whereby varying degrees of pressure can be established therein. A piston assembly is disposed in the bore, forming, in conjunction with the bore, a variable volume chamber with respect to the outlet and comprises a first member carried by the pressure responsive member and a second member capable of establishing and blocking communication as between the inlet and outlet. A passage is provided through the piston assembly so that the brake actuating hydraulic fluid exerts pressure on each end portion of the assembly.

In operation, the establishment of a pressure differential as between the chambers of the cavity actuates the pressure responsive member causing the first member of the piston assembly to move. Movement of the first member causes the second member of the piston assembly to move from a first position wherein communication between the inlet and outlet is established to a second position wherein such communication is blocked, with the first and second members of the piston assembly cooperating such that the volume of the variable volume chamber is greatest after the communication between the inlet and outlet is blocked. Accordingly, movement of the piston assembly to the second position prevents further increase of the braking pressure between the pressure reducer valve and the wheel brake and the increased volume of the variable volume chamber results in a reduced pressure in the portion of the brake line between the pressure reducer valve and the associated wheel brake cylinder.

From the foregoing it is apparent that the arrangement of this invention overcomes the problems set forth above. Thus, substantially equal brake actuating hydraulic fluid pressure is exerted against each end of the piston assembly and, therefore there is no requirement for a large, heavy spring member as in heretofore known devices. Accordingly, a relatively small size valve of faster response can be employed. Moreover, as the passage in the piston assembly provides for continuous communication between the end portions thereof, the brake actuating hydraulic pressure acting on opposite sides of the pressure responsive member is the same at any given level of pressure and, hence, the pressure reducer valve does not place a restriction on the hydraulic pressures which can be employed in the brake system, as is the case in heretofore known devices employing spring loaded diaphragms.

DESCRIPTION OF THE DRAWINGS

In the accompanying drawing, in which one of the various possible embodiments is illustrated, FIG. 1 is a cross-sectional view of a device constructed in accordance with this invention showing the components thereof when it is in its normal open state;

FIG. 2 is a similar cross-sectional view of the device shown in FIG. 1 showing the components thereof when it is actuated to a closed state in response to conditions of wheel skid.

Like parts are indicated by corresponding reference characters throughout the several views of the drawing.

DESCRIPTION OF THE PREFERRED EMBODIMENT

Figure 3:
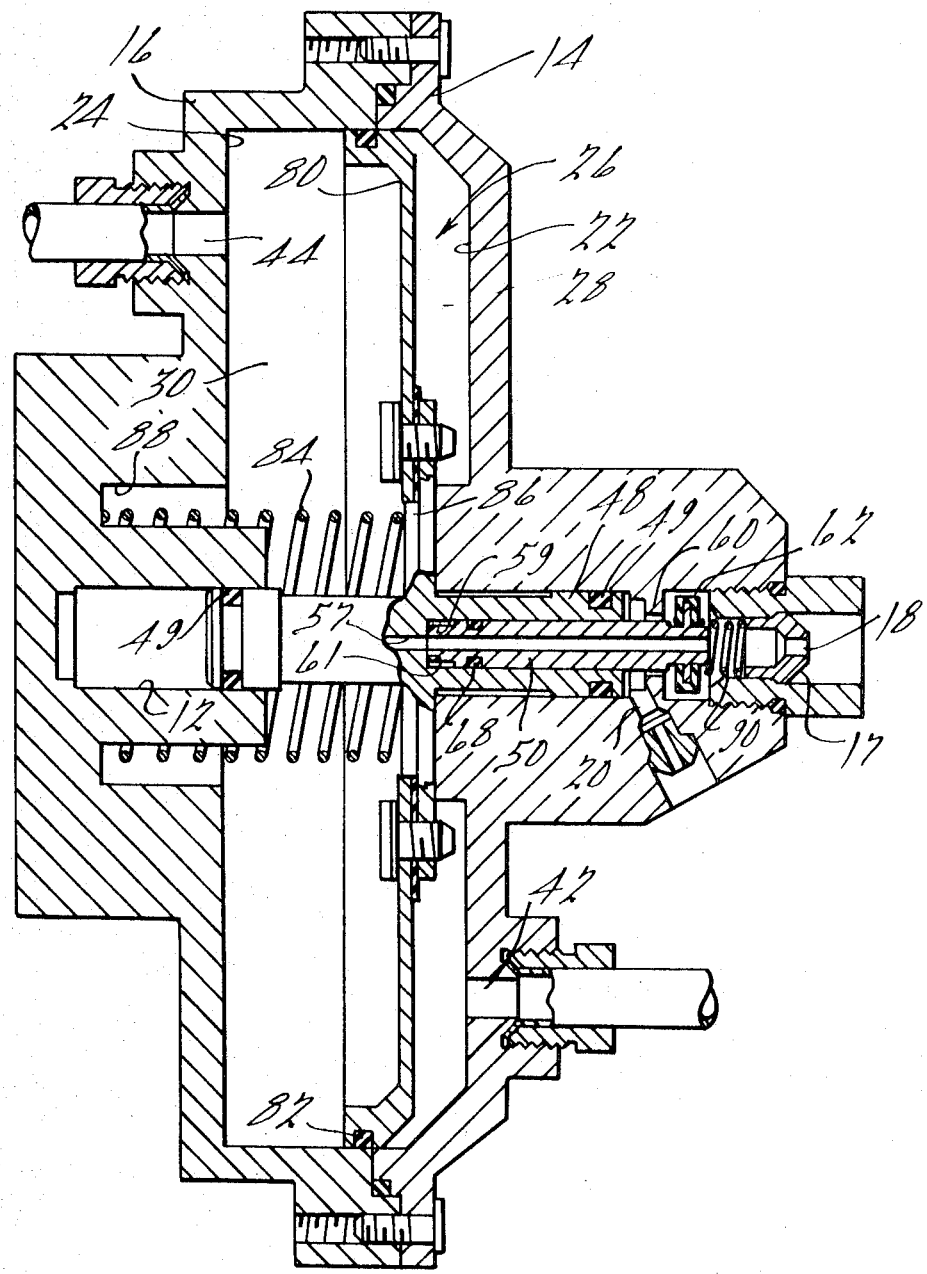
FIG. 3 is a view similar to FIG. 1 showing a modified embodiment of the invention.

The pressure reducer valve of this invention is shown in FIGS. 1, 2 and 3 of the accompanying drawings and comprises a body or housing, indicated generally by reference numeral 10, having a cylindrical bore 12. For ease of assembly, housing 10 is composed of two sections 14 and 16. Housing 10 has a plug 17 which defines an inlet port 18 adapted to be connected with a brake line conduit from the master cylinder (not shown), and an outlet port 20 in communication with bore 12 adapted for connection with a wheel brake cylinder (not shown). Each of the housing sections 14 and 16 has a recessed surface 22 and 24 which cooperate so as to provide a cavity 26 in housing 10 which is divided into two chambers 28 and 30 by means of a pressure responsive means such as the diaphragm 32 of FIGS. 1 and 2 or piston 80 of FIG. 3. FIGS. 1 and 2 illustrate a diaphragm member 32 which can be fabricated from any material commonly used for diaphragms, and is preferably composed of a relatively thin circular sheet of high tensile strength synthetic rubber or plastic material such as polyethylene terephthalate which is commonly known as Mylar. Diaphragm support members 34 and 36 are secured to diaphragm 32 by any suitable conventional means, such as a fastener 37 or adhesive, and the diaphragm 32 is peripherally secured between the opposing surfaces 38 and 40 of housing sections 14 and 16 thereby forming, in cooperation with recessed surfaces 22 and 24, chambers 28 and 30.

Normally, a pressure differential is created across the pressure-responsive means by maintaining chambers 28 and 30 at different pressures such that the various components of the valve assume the positions as shown in FIG. 1. This may be accomplished, for example, by maintaining chamber 30 at a pressure less than atmospheric and chamber 28 at atmospheric pressure by means of a conventional solenoid vacuum valve (not shown) which is connected with chambers 28 and 30 by means of ports 42 and 44, respectively. The vacuum can be supplied by any source such as the engine intake manifold and, as with heretofore known devices, the solenoid vacuum valve is capable of switching or applying vacuum to the opposite side of the diaphragm in response to indicia of wheel skidding. Thus, in the event of a wheel entering a skid condition, a sensing unit of any type will cause the solenoid vacuum valve to switch application of the vacuum to the opposite side of the diaphragm and admit atmospheric pressure to its other side thereby causing the valve components to assume positions as shown in FIG. 2.

It will be apparent that the pressure differential across the diaphragm, i.e., between chambers 28 and 30, can be accomplished in any number of ways and the particular manner chosen is in no way critical to the invention. One successfully employed practice has been to suspend the diaphragm in a vacuum during normal brake operation by maintaining a partial pressure, that it, a pressure less than atmospheric, in both chambers 28 and 30, which chambers were sized such that application of a given vacuum source to both chambers would result in the components assuming positions as in FIG. 1. Upon development of a wheel skid condition, chamber 30 is opened to atmospheric pressure thereby causing the valve components to shift from that shown in FIG. 1 to the position of FIG. 2. Suspension of the pressure responsive member in a vacuum, i.e., maintaining partial pressure on both sides of diaphragm 32 has the advantage of not depleting the vacuum source so rapidly in that it is not necessary to create a vacuum condition on one side of the diaphragm to instigate initial movement.

It will be appreciated that the diaphragm 32 could be actuated by means of liquid pressure, as for example, by maintaining a hydraulic fluid in each of chambers 28 and 30. The hydraulic fluid could then be introduced or removed from the chambers in response to the sensing unit via ports 42 and 44 to provide the proper pressure balance or differential. Likewise it will be apparent that, if desired, a pressure greater than atmospheric instead of a vacuum, or partial pressure, can be selectively applied in either of the chambers 28 and 30 so as to provide the necessary pressure differential across the diaphragm. While the use of superatmospheric pressure is contemplated, as for example with trucks having air compressors, the balance of this description will relate to maintaining a vacuum, that is, a partial pressure on one side of the diaphragm while applying atmospheric pressure to its opposite side to thereby provide actuation.

As shown in FIGS. 1 and 2, piston assembly indicated generally by reference numeral 46 is positioned within bore 12 such that it extends through and on either side of the diaphragm 32. The piston assembly 46 comprises a first member 48 and a second member 50. The first piston assembly member 48 is in slidable contact with the wall of bore 12 and has a pair of laterally spaced, radially extending flange members 52 and 54 which are pressed into engagement with the diaphragm support members 34 and 36. Accordingly, piston assembly member 48 is carried by the diaphragm component and slides in the bore in response to movement of the diaphragm 32. Seals 49 are provided to prevent the passage of hydraulic fluid into cavity 26. The second piston assembly member 50 is partially disposed in a bore 56 extending axially through the first piston assembly member 48 and projects through an orifice 58 formed by a radially inwardly extending flange portion 60 of bore 12. A head portion 62 provided with a groove 64 is formed at one end of the second piston assembly member 50, which is also provided with bore 66 extending axially therethrough. As the second piston assembly member 50 is slidably telescoped into first piston assembly member 48, it is seen that the bores 66 and 56 of the second and first piston assembly members cooperate so as to form a passage extending completely through piston assembly 46.

During normal brake operation when no wheel lock or skidding is encountered, a solenoid vacuum valve as used in conjunction with heretofore known antiskid systems connects chamber 30 with a vacuum reservoir via port 44, while chamber 28 has atmosphere pressure communicated to it through port 42. Accordingly, the components of the pressure reducer valve 10 assume the positions shown in FIG. 1. In this position, brake actuating hydraulic fluid enters the valve 10 through inlet 18, passes, by means of the groove 64 in piston head portion 62 into bore 12, through the orifice 58 and out through port 20 to the associated wheel brake cylinder. At the same time, brake actuating hydraulic fluid pressure is exerted through bore 66 of the second piston assembly member 50 and bore 56 of the first piston assembly member 48 thereby applying equal brake actuating hydraulic fluid pressure on each end portion of the piston assembly 46.

It will be apparent that as the opposite ends of the piston assembly 46 are in continuous communication and subjected to equal brake actuating hydraulic fluid pressure, the brake actuating hydraulic pressure can be increased to whatever level the vehicle operator feels necessary and such increase in pressure will not actuate the pressure reducer valve.

It will now be assumed that the vehicle brakes are applied and one or more of the vehicle wheels lock or commences to skid. At this instant, a sensing unit of any type will cause a solenoid vacuum valve to switch application of the vacuum reservoir to the opposite side of the diaphragm and admit atmospheric pressure to its other side. Under these conditions, the diaphragm 32 will be forced to the right as in FIG. 2 and such diaphragm movement will carry the first piston assembly member 48 to the right. It will be apparent that if the diaphragm is vacuum suspended it will be actuated by opening one of the ports 42, 44 to the atmosphere. Initial movement of member 48 will cause the second piston assembly member 50 to be dragged to the right by means of the frictional force of a seal 68 which is disposed in a groove in the first piston assembly member 48 so as to be in engagement with the peripheral surface of the second piston assembly member 50. As seen in FIG. 2, the initial movement of the first piston assembly member 48 will cause the second piston assembly member 50 to move to the right until it seats against flange 60, which is provided with a seal 70, thereby blocking communication as between the inlet and outlet ports 18 and 20 and preventing any increase in brake actuating hydraulic pressure from being transmitted to the associated wheel brake cylinder. Further movement of the first piston assembly member 48 to the right increases the volume of that portion of the bore 12 between flange 60 and first piston assembly member 48 which is in communication with outlet port 20 thereby causing the hydraulic pressure in the brake line to the associated wheel brake cylinder to drop so as to enable the wheel to revolve freely. The brake actuating hydraulic fluid displaced during this movement passes through the passage in the piston assembly 46 so as to maintain both sides of the assembly at equal pressure.

As soon as the skidding wheel is revolving freely, the sensing unit will cause the solenoid vacuum valve to reverse the pressure conditions on the diaphragm 32, thereby causing it to return to the left as in FIG. 1 and carry the first piston assembly member 48 to the left. In the case of vacuum suspension of the diaphragm this return movement can be facilitated by means of a low rate spring as shown in FIG. 3. Again, initial movement of the first piston assembly member 48 will cause, through the frictional force of seal 68, the second piston assembly member 50 to move to the left until it abuts surface 72 of plug 17. First piston assembly member 48 will then continue to move to the left until it abuts a stop surface such as a washer 74 which is mounted in a groove formed in the periphery of the second piston assembly member 50. The cycle of operation is then repeated if the associated wheel enters another skid condition.

FIG. 3 illustrates an embodiment of the invention wherein the first piston assembly member 48 is provided with a longitudinal extending stepped bore composed of a diametrically reduced portion 57 and a diametrically enlarged or counterbored portion 59, with the juncture of these two bores forming an annular seat or stop surface 61. The second piston assembly member 50 is partially disposed in the counterbore portion 59 and seat 61 functions as a stop surface, as did washer 74 described above in connection with FIGS. 1 and 2, to define the travel of first piston assembly member 48 as it moves to the left as viewed in FIG. 3.

As described above, movement of piston assembly 46 is controlled by pressure responsive means located in cavity 26. FIG. 3 illustrates the use of a piston 80 as the pressure responsive means with the piston being provided with a seal 82 to prevent passage of fluid between the two chambers 28 and 30. Piston 80 can be actuated by hydraulic fluid pressure wherein the hydraulic fluid communicates with each of the chambers 28 and 30 through ports 42 and 44 respectively. Such a hydraulically actuated piston 80 has a as its principle advantage the fact that only a very small diameter piston is needed thereby greatly reducing the size of the valve as compared to a pneumatically actuated diaphragm as shown in FIGS. 1 and 2. It will be recognized that the hydraulic fluid used to actuate the piston 80 would be stored in a separate reservoir and thus be totally independent of the fluid used to actuate the vehicle brakes, which latter fluid is designated herein as brake actuating hydraulic fluid to distinguish it from hydraulic fluid used in chambers 28 and 30.

The embodiment shown in FIG. 3 also illustrates the use of a lightweight or low rate spring 84 which aids return of the pressure responsive means and piston assembly 46 to their normal positions assumed in nonskid brake operation. Spring 84 engages a central hub portion 86 of piston 80 and, to minimize space requirement, its other end is located in a recess 88 in housing section 16. The use of the spring 84 has been found particularly beneficial when the pressure responsive means is a vacuum suspended diaphragm. Thus, the spring is low rate, as for example 20–30 pounds and does not interfere with movement of the diaphragm when atmospheric pressure is applied to the side of the diaphragm opposite the spring thereby providing a pressure differential of several hundred pounds which easily overrides the spring pressure. However, when the vacuum source is again connected with both chambers the spring 80 quickens the return movement of the diaphragm and insures full and positive return to normal position.

FIG. 3 also illustrates the use of a spring 90 which prevents premature unseating of head portion 62 of the second piston assembly member 50 from flange 60. Spring 90 need only be of a rate to resist the initial frictional drag of seal 68 which would tend to open communication between inlet 18 and outlet 20 by unseating head portion 62 before the first piston assembly member 48 had moved a sufficient amount to provide the desired volume in the portion of the bore 12 between flange 60 and first piston assembly member 48.

The pressure reducer valve of this invention has been constructed, installed and tested in a vehicle and was found to give highly satisfactory results. The unit employed was of approximately three inches in diameter and, hence, was essentially only one half the size of heretofore known similar devices. Moreover, it was found that the unit upon being actuated reduced the pressure in the brake line of the skidding wheel by approximately 600 p.s.i., a reduction which was sufficient under all conditions of wheel skid to enable the wheel to return to a rotating condition relative to the road surface.

In view of the foregoing it will be seen that the several objects and other advantages of this invention are achieved. A small, highly responsive pressure reducer valve has been provided which does not limit the amount of hydraulic pressure which can be applied to the brakes during normal nonskidding operation.

Although only one embodiment of the invention has been disclosed and described, it is apparent that other embodiments and modifications of the invention are possible within the scope of the appended claims.

I claim:

1. A pressure-regulating device for a vehicular hydraulic brake system, said device comprising a body having a bore and a cavity therein, pressure-responsive means dividing said cavity into first and second chambers, inlet and outlet brake actuating hydraulic fluid ports in communication with said bore, valve means adapted for movement in said bore from a first position wherein communication between said inlet and outlet ports is established to a second position wherein communication between said inlet and outlet ports is blocked, said movement of said valve means being in response to movement of said pressure-responsive means and effective to form a variable volume chamber with respect to said outlet port such that the volume of said variable volume chamber is greatest when the communication between said inlet and outlet ports is blocked, said valve means comprising a first member and a second member which moves in response to and only during a portion of the movement of said first member, and a passageway extending through said first and second members and communicating with opposite end portions of said bore to define a brake actuating hydraulic fluid chamber composed of said bore end portions and passageway whereby brake actuating hydraulic fluid in said chamber is in contact with opposite end portions of said valve means so as to provide substantially equal brake actuating hydraulic fluid pressure on opposite end portions of said valve means.

2. A pressure-regulating device comprising a body having a bore therein, inlet and outlet brake actuating hydraulic fluid ports in communication with said bore, valve means in said bore movable from a first position wherein communication between said inlet and outlet ports is established to a second position wherein communication between said inlet and outlet ports is blocked, said valve means comprising first and second tubular members with said second member being slidably telescoped in said first member, said tubular members cooperating so as to form a passageway communicating between portions of said bore such that the opposite end portions of said valve means are subjected to substantially equal brake actuating fluid pressure, pressure responsive means for selectively moving said valve means between said first and second positions, said first tubular member moving in response to movement of said pressure-responsive means so as to form a variable volume chamber with respect to said outlet port, and said second tubular member moving in response to and during a portion of the movement of said first tubular member and remaining stationary during another portion of the movement of the first tubular member so as to establish and block communication with said inlet and outlet ports, said first and second tubular members cooperating such that the volume of said variable volume chamber is greatest when the communication between said inlet and outlet ports is blocked.

3. A pressure-regulating device for a vehicular hydraulic brake system, said device comprising a body having a bore and a cavity therein, pressure responsive means dividing said cavity into first and second chambers, inlet and outlet brake actuating hydraulic fluid ports in communication with said bore, valve means adapted for movement from a first position wherein communication between said inlet and outlet ports is established to a second position wherein communication between said inlet and outlet ports is blocked, said valve means being disposed in said bore so as to extend on opposite sides of said pressure responsive means and including a first tubular member slidably disposed in said bore and connected to said pressure-responsive means to move in said bore in response to movement of said pressure-responsive means so as to form a variable volume chamber with respect to said outlet port, and a tubular valve member slidably telescoped in said first member and adapted upon movement of said first member to move so as to selectively establish and block communication between said inlet and outlet ports, said tubular members cooperating to form a passageway communicating between portions of said bore so as to provide substantially equal brake actuating hydraulic fluid pressure on opposite end portions of said valve means.

4. A pressure-regulating device for a vehicular hydraulic brake system, said device comprising a body having a bore and a cavity therein, pressure-responsive means dividing said cavity into first and second chambers, inlet and outlet brake actuating hydraulic fluid ports in communication with said bore, valve means adapted for movement from a first position wherein communication between said inlet and outlet ports is established to a second position wherein communication between said inlet and outlet ports is blocked, said valve means including a first tubular member slidably disposed in said bore and connected to said pressure-responsive means to move in said bore in response to movement of said pressure responsive means so as to form a variable volume chamber with respect to said outlet port, and a valve member slidably telescoped in said first member to selectively establish and block communication between said inlet and outlet ports, said valve means including means disposed between said tubular member and said valve member for frictionally engaging said members, said frictional engagement causing said valve member to move in response to movement of said first tubular member, and a passageway communicating between portions of said bore on opposite sides of said pressure-responsive means so as to provide substantially equal brake actuating hydraulic fluid pressure on opposite end portions of said valve means.